United States Patent Office 2,900,377
Patented Aug. 18, 1959

2,900,377

PHOSPHORUS SULFIDE DERIVATIVES OF HEXA-CHLOROCYCLOPENTADIENEPOLYOLEFIN ADDUCTS

Ellis Kirby Fields, Chicago, Ill., assignor to Standard Oil Company, Chicago, Ill., a corporation of Indiana No Drawing. Application June 26, 1956
Serial No. 593,792

7 Claims. (Cl. 260—139)

This invention pertains to novel derivatives of hexachlorocyclopentadiene, and more particularly it relates to novel compositions of matter which are prepared by reacting a phosphorus sulfide with an adduct of hexachlorocyclopentadiene with a polyolefin.

An object of the present invention is to provide as new compositions of matter phosphorus- and sulfur-containing derivatives of adducts of hexachlorocyclopentadiene with polyolefins. Another object of this invention is to provide novel phosphorus- and sulfur-containing derivatives of adducts of hexachlorocyclopentadiene with polyolefins having properties which adapt them for use as insecticide, fungicides, and as additives for lubricants. Other objects and advantages of the invention will become apparent from the following description thereof.

In accordance with the present invention, the novel composition of matter can be prepared by heating the polyolefin with hexachlorocyclopentadiene in mole ratios of 3:1 to 1:1 at temperatures of from about 85° C. to about 170° C. for a period sufficient to form the adduct, usually for about 2 to 40 hours, removing the unreacted material, and then reacting the resultant adduct with from about 2% to about 50% of a phosphorus sulfide at a temperature of from about 85° C. to about 200° C. for about 1 to 20 hours. The formation of the hexachlorocyclopendatiene-polyolefin adduct may be conducted at atmospheric pressure or at superatmospheric pressure, for example at pressures up to about 200 pounds per square inch. The reaction of the adduct with the phosphorus sulfide is usually carried out at atmospheric pressure although, if desired, pressures up to about 200 pounds per square inch can be employed.

The term polyolefin as used herein and in the appended claims means aliphatic, alicyclic, and aromatic olefins containing from about 4 to about 60 carbon atoms and 2 to 6 double bonds. Examples of such polyolefins are butadiene, isoprene, 1-vinyl cyclohexene-3, dl-limonene (dipentene), myrcene, phellandrene, allo-ocimene, squalene, phenylbutadiene, trimethyl-phenyl-allene, 1,6-diphenyl hexatriene, divinyl benzene, etc.

The phosphorus sulfide reacted with the adduct can be $P_4S_3$, $P_4S_5$, $P_4S_7$ and preferably $P_2S_5$ or $P_4S_{10}$.

The following examples are given by way of illustrating the present invention, and are not intended to limit the same.

Example I 83.22 cc. (1 mole) liquid butadiene was allowed to vaporize into 160 cc. (1 mole) hexachlorocyclopentadiene at 220° F. with stirring and refluxing for about 1.5 hours, and the mixture distilled in vacuo. The resultant adduct recovered, amounting to a yield of 70%, had a boiling point of 95° C. at 0.6 mm. and a refractory index ($n_D^{20}$) of 1.5532.

| Analysis | Chlorine, percent | Molecular Weight |
|---|---|---|
| Calculated for $C_9H_6Cl_6$ | 65.10 | 326.7 |
| Found | 64.80 | 332±10 |

Example II

A mixture of 32.6 grams (0.1 mole) of the product of Example I and 11 grams (0.05 mole) $P_2S_5$ was stirred at 160° C. for 4 hours. The resultant mixture was cooled, diluted with 200 cc. hexane and 50 cc. benzene, filtered, and evaporated. A very viscous brown product was obtained which contained 51.9% chlorine, 4.65% phosphorus and 8.03% sulfur.

Example III

To 103 cc. (0.65 mole) hexachlorocyclopentadiene there were added slowly over a period of one hour 44 cc. (0.65 mole) isoprene at a temperature of 230–240° F. with stirring. After heating the mixture at 300° F. for 0.5 hour, the product was distilled in vacuo, giving a 45% yield of an adduct boiling at 103° C. at 0.5 mm. pressure and an $n_D^{22}$ of 1.5519.

| Analysis | Chlorine, percent | Molecular Weight |
|---|---|---|
| Calculated for $C_{10}H_8Cl_6$ | 64.18 | 340.7 |
| Found | 64.80 | 350±10 |

Example IV

A mixture of 68.1 grams (0.2 mole) of the product of Example III and 22.2 grams (0.1 mole) $P_2S_5$ was stirred at 280° F.–300° F. for 1.75 hours and then filtered hot through celite. The filtrate weighing 78 grams was a very viscous brown product containing 52.5% chlorine, 4.23% phosphorus and 20.1% sulfur.

Example V

A mixture of 54 grams (0.5 mole) 1-vinyl cyclohexene-3 and 80 cc. (0.5 mole) hexachlorocyclopentadiene was heated to 130° C. At this point there was a rapid reaction and the temperature rose sharply to 160° C. The temperature was reduced to 130° C. and maintained there for 6 hours. The product was then distilled, yielding 100 grams of adduct having a boiling range of 159–167° C. at 0.8 mm. pressure, and an $n_D^{20.5}$ of 1.5662.

| Analysis | Chlorine, percent | Molecular Weight |
|---|---|---|
| Calculated for $C_{13}H_{12}Cl_6$ | 55.82 | 380.7 |
| Found | 54.90 | 371±10 |

Example VI

A mixture of 19 grams (0.05 mole) of the adduct of Example V and 5.5 grams (0.025 mole) $P_2S_5$ was stirred at 340–350° F. for about 15 minutes until all of the solid had reacted. Twenty-three grams of a very viscous brown product was obtained which contained 40.70% chlorine, 7.81% sulfur and 3.48% phosphorus.

Example VII

A mixture of 161 cc. (1 mole) dl-limonene (95% pure) and 80 cc. (0.5 mole) hexachlorocyclopentadiene was heated at 145° C. for 16 hours, and then distilled to a pot temperature of 140° C. at 0.8 mm. pressure. Seventy cc. of dipentene was recovered, leaving a residue of 182 grams. The residue was taken up in 500 cc. hexane, filtered through Attapulgus clay, and evaporated on a steam bath. One hundred twenty-seven grams of a brown oily product was recovered.

| Analysis | Chlorine, percent | Molecular Weight |
|---|---|---|
| Calculated for $C_{15}H_{16}Cl_6$ | 52.00 | 408.7 |
| Found | 50.20 | 415±20 |

Example VIII

A mixture of 81.7 grams (0.2 mole) of the product of Example VII and 22.2 grams (0.1 mole) $P_2S_5$ was stirred and slowly heated. Reaction started at 250° F. with the evolution of heat and was over in 20 minutes at 300° F. The resultant viscous product was diluted with a mixture of 100 cc. hexane and 100 cc. benzene, filtered and the filtrate evaporated. The recovered brown viscous oil, amounting to 98.6 grams, contained 30.15% chlorine, 3.00% phosphorus and 6.00% sulfur.

Example IX

A mixture of 112.5 cc. (0.5 mole based on 75% purity) myrcene and 80 cc. (0.5 mole) hexachlorocyclopentadiene was heated at 230° F. for 5 hours at 300° F. for 4 hours, and the reaction product then distilled in vacuo up to a pot temperature of 140° C. at 0.4 mm. pressure. A dark brown viscous residue, amounting to a yield of 93% was obtained.

| Analysis | Chlorine, percent | Molecular Weight |
|---|---|---|
| Calculated for $C_{15}H_{16}Cl_6$ | 52.20 | 408.7 |
| Found | 50.85 | 420±10 |

Example X

A mixture of 81.7 grams (0.2 mole) of the product of Example IX and 22.2 grams (0.1 mole) $P_2S_5$ was stirred at 300° F. for 30 minutes at which time all of the solid had reacted. The resultant dark brown viscous product, amounting to 96.8 grams, contained 39.85% chlorine, 3.99% phosphorus and 9.2% sulfur.

The above described reaction product can be converted to acidic materials by steam at a temperature of from about 220° F. to about 400° F. The salts of the acidic products can be obtained by neutralizing the same with suitable basic reagents such as hydroxides, oxides, sulfides, and carbonates of an alkali metal, an alkaline earth or a heavy metal, such as for example NaOH, $Na_2S$, $K_2CO_3$, KOH, LiOH, $Li_2O$, $Li_2CO_3$, $CaCO_3$, CaO, BaO, $BaCO_3$, $Ba(OH)_2$, $SrCO_3$, ZnO, PbO, $SnO_2$, or $Cr_2O_3$. Similarly, the acidic products can be neutralized with a basic nitrogen compound, such as ammonia, amines, and the like.

The herein described phosphorus sulfide derivatives of the hexachlorocyclopentadiene-polyolefin adducts are particularly suitable for use in amounts of from 0.05% to about 10% as addition agents for lubricating oils to impart extreme pressure properties as well as corrosion and oxidation inhibiting properties to such lubricants.

Suitable lubricating base oils are hydrocarbon oils, e.g. petroleum oils, synthetic hydrocarbon lubricating oils such as those obtained by the polymerization of hydrocarbons, and other synthetic lubricating oils such as alkylene oxide type oils, for example, the "Ucon Oils" marketed by Carbide and Carbon Corporation, polycarboxylic acid ester-type oils such as esters of adipic acid, sebacic acid, azelaic acid, etc. and other synthetic lubricating oils.

Lubricating oils containing the herein described derivatives exhibit excellent extreme pressure properties as demonstrated by the data in Table I. The Almen values were determined on the Almen Tester in the manner described in the Proceedings of the 15th Annual Meeting American Petroleum Institute 15, Sect. III, 60 (1934) or the Oil and Gas Journal 33, No. 26, 123, 126 (1934).

TABLE I

| Product | Concentration, Percent [b] | Almen Test | |
|---|---|---|---|
| | | Pass (1b) | Fail (1b) |
| Control [a] | | 6 | 8 |
| Example II | 0.50 | 28 | 30 |
| Example IV | 0.50 | 30+ | 16 |
| | 0.10 | 30+ | |
| | 0.05 | 14 | |
| Example VI | 0.50 | 30+ | 24 |
| | 0.25 | 22 | |
| Example VIII | 0.50 | 30+ | 16 |
| | 0.25 | 30+ | |
| | 0.10 | 14 | |
| Example X | 0.50 | 30+ | 16 |
| | 0.25 | 30+ | |
| | 0.10 | 14 | |

[a] Solvent-extracted SAE 30 oil.
[b] Concentration of additive in the control oil.

The effectiveness of the herein described derivatives in inhibiting oxidation and the corrosion of copper and/or lead-containing metals, such as, for example, copper-lead alloys is demonstrated by subjecting lubricants containing the derivative to the following test.

A copper-lead test specimen is lightly abraided with steel wool, washed with naphtha, dried and weighed to the nearest milligram. The cleaned copper-lead test specimen is suspended in a steel beaker, cleaned with a hot trisodium phosphate solution, rinsed with water, acetone and dried, and 250 grams of the oil to be tested, together with 0.625 gram lead oxide and 50 grams of a 30–35 mesh sand charged to the beaker. The beaker is then placed in a bath or heating block and heated to a temperature of 300° (±2° F.), while the contents are stirred by means of a stirrer rotating at 750 r.p.m. The contents of the beaker are maintained at this temperature for twenty-four hours, after which the copper-lead test specimen is removed, rinsed with naphtha, dried and weighed. The test specimen is then replaced in the beaker and an additional 0.375 gram of lead oxide added to the test oil. At the end of an additional twenty-four hours of test operation, the test specimen is again removed, rinsed and dried as before, and weighed. The test specimen is again placed in the beaker together with an additional 0.250 gram of lead oxide and the test continued for another twenty-four hours (seventy-two hours total). At the conclusion of this time, the test specimen is removed from the beaker, rinsed in naphtha, dried and weighed. Acidity in terms of KOH per gram of oil product is also determined.

The loss in weight of the test specimen is recorded after each weighing.

This test, known as the Sand Stirring Corrosion Test, is referred to hereinafter as "SSCT."

The following products were subjected to the above test and results tabulated in Table II.

Product A—(Control) Solvent-extracted 30 SAE base oil +3.3% barium-containing neutralized reaction product of $P_2S_5$ and a polybutene of about 1000 molecular weight.
Product B—A+1.5% product of Example IV.
Product C—A+1.5% product of Example VI.
Product D—A+1.0% product of Example VI.
Product E—A+0.75% product of Example VI.

TABLE II

| Product | SSCT | | | | |
|---|---|---|---|---|---|
| | Acidity (mg. KOH/g. oil) | | | Corrosion (mg. wt. loss) | |
| | 24 Hours | 48 Hours | 72 Hours | 48 Hours | 72 Hours |
| A (Control) | 6.16 | 14.0 | 16.8 | 698 | 1,360 |
| B | 1.4 | 2.8 | 5.0 | 114 | 201 |
| C | 1.4 | 2.8 | 3.6 | 52 | 81 |
| D | 1.12 | 2.8 | 5.08 | 101 | 154 |
| E | 0.84 | 4.2 | 7.28 | 132 | 265 |

Since weight losses of 200 milligrams in 48 hours and 500 milligrams in 72 hours are permitted in the test, the corrosion inhibiting properties of the herein described phosphorus sulfide derivatives is clearly demonstrated by the above data.

While this invention has been described in connection with the use of the herein described additives and lubricant compositions, their use is not limited thereto but the same can be used in products other than lubricating oils, such as for example, fuel oils, insulating oils, greases, non-drying animal and vegetable oils, waxes, and asphalts.

Concentrates of a suitable oil base containing more than 10%, e.g. from about 15% to about 50% or more, of the herein described derivatives, alone, or in combination with more than 10% of other additives, can be used for blending with other oils in proportions desired for the particular condition or use to give a finished product containing from about 0.05% to about 10% of the described derivative.

Lubricant composition containing the herein described derivatives can contain other addition agents such as, for example, antioxidants, pour point depressors, V.I. improvers, etc.

Unless otherwise stated, percentages given herein and in the appended claims are weight percentages.

Oleaginous compositions containing the phosphorus sulfide derivatives of hexachlorocyclopentadiene-polyolefin adducts is being claimed in my co-pending application Serial No. 785,786, filed January 9, 1959 as a division of the present application.

Although the present invention has been described with reference to specific preferred embodiments thereof, the invention is not to be considered as limited thereto, but includes within its scope such modifications and variations as come within the spirit of the appended claims.

I claim:

1. As a composition of matter the phosphorus- and sulfur-containing reaction product of a phosphorous sulfide and an adduct of hexachlorocyclopentadiene with a polyolefin having from about 4 to about 30 carbon atoms and from 2 to about 3 double bonds, obtained by reacting said adduct with from about 2% to about 50% of a phosphorus sulfide at a temperature of from about 85° C. to about 200° C. for a time sufficient to complete said reaction and recovering the resultant reaction product.

2. A composition of matter as described in claim 1 in which the polyolefin is butadiene.

3. A composition of matter as described in claim 1 in which the polyolefin is isoprene.

4. A composition of matter as described in claim 1 in which the polyolefin is 1-vinylcyclohexene.

5. A composition of matter as described in claim 1 in which the polyolefin is dl-limonene.

6. A composition of matter as described in claim 1 in which the polyolefin is myrcene.

7. A composition of matter as described in claim 1 in which the phosphorus sulfide is phosphorus pentasulfide.

References Cited in the file of this patent
UNITED STATES PATENTS

| 2,379,312 | May | June 26, 1945 |
| 2,379,453 | Noland | July 3, 1945 |
| 2,381,907 | Hughes | Aug. 14, 1945 |
| 2,382,775 | Cook | Aug. 14, 1945 |
| 2,424,402 | Loane | July 22, 1947 |